United States Patent [19]

Satore

[11] Patent Number: 5,040,842
[45] Date of Patent: Aug. 20, 1991

[54] SPOT VISOR

[76] Inventor: James J. Satore, 128 Morris St., Albany, N.Y. 12208

[21] Appl. No.: 428,158

[22] Filed: Oct. 27, 1989

[51] Int. Cl.$^5$ ............................................. B60J 3/00
[52] U.S. Cl. ................................................. 296/97.8
[58] Field of Search ................ 296/97.2, 97.7, 97.8, 296/97.6

[56] References Cited

U.S. PATENT DOCUMENTS

| | | | |
|---|---|---|---|
| 2,706,659 | 4/1955 | Landis | 296/97.7 |
| 2,927,819 | 3/1960 | Johnson | 296/97.8 |
| 3,877,745 | 4/1975 | Girard | 296/97.6 |
| 3,961,820 | 6/1976 | Spangler | 296/97.6 |
| 3,988,033 | 10/1976 | Vacha | 296/97.6 |
| 4,023,854 | 5/1977 | Nack, Jr. | 296/97.6 |
| 4,090,733 | 5/1978 | Altscherl | 296/97.6 |
| 4,558,899 | 12/1985 | Chu et al. | 296/97.8 |

Primary Examiner—Robert R. Song

[57] ABSTRACT

A Spot Visor for vehicles comprised of a resilient arm which exerts a force to place a light shield on the windshield to effectivly control the undesirable light at the point of entry. The light shield may be moved with a handle as part of the resilient arm and light shield. Having a channel means at the vehicle ceiling to allow the flexible arm to move within and allowing for the positioning, in any direction, of the light shield. Use of the vehicle visor can remain unchanged.

10 Claims, 2 Drawing Sheets

SPOT VISOR

BACKGROUND OF THE INVENTION

1. Field of Invention

This invention relates in general to vehicle visors and in particular to a spot visor having a light shield. The light shield can move to cooperate with the vehicle visor or functions independently to cover parts of a windshield that are difficult to reach.

2. Description of the Prior Art

A great deal of light coming through the windshield from sun or car headlamps can interfere with a person's driving. To control and/or eliminate this undesirable light, vehicles are provided with vehicle visors. However, these vehicle visors can not cover enough area sometimes and at other times provide more of a coverage than is desirable.

To provide more desirable coverage for light coming from the sun or other vehicle headlamps, many devises have been proposed. The following are examples at such devices: Information is disclosed in U.S. Pat. No. 4,090,733 issued to Louis T. Altschul on May 23, 1978, the devise is relatively small. However, it moves about a pivot point forming a circular path. Also there is a pivot point in the shielding portion which can wear in a relatively short time due to the forces involved. The the devise arm or shielding position may move on its own due to loose rivets or material. Additionally, the devise is made to operate on a circular path and unable to cover the sun which varies from sunrise to sunset. Also, when the devise is operating with the visor up, any movement to bring the visor down (toward the windshield) will cause the device to hit the windshield and possibly damage the device.

Anothe example can be seen in U.S. Pat. No. 3,877,745 issued to George K. Girard on Apr 5, 1975 contains a plate which can be moved in a channel parallel to the bottom of car visor. It functions only when the car visor is pulled down. This is difficult to do when the car is moving. Also the viewing area of the windshield is reduced. Additionally, it would not operate to cover positions for example, near the center of the windshield.

Reference is made to a device referred to as Bright Spot manufactured by Cobbs Manufacturing, Des Moines, IA 50309, which is not patented. It is a rectangular shape of translucent plastic containing at its midportion a suction cup. It can be place anywhere on the windshield. However, when applied to the windshield, the device falls if too little pressure is used and is very difficult to remove when large pressure is applied. Also, the condition of the windshield, whether clean or filmy, affects the suction cup. These conditions present difficulty when driving.

SUMMARY OF THE INVENTION

This invention is a new, improved and novel spot visor which can be used in conjunction with a conventional vehicle visor or can operate independently. In addition, the operation of the vehicle visor can continue unimpeded by the movement of a arm visor.

Devices have been directed toward eliminating harmful light in vehicles. The object of this invention is to avoid attaching anything to the vehicle visor while not requiring the manipulation of the vehicle visor to position the light shield on the windshield.

In this embodiment, the light shield is urged against the windshield by way of a resilient arm which is positioned, having three contact points. One point is between the windshield and the light shield and another being a bearing which is in contact a conventional vehicle ceiling. A third point is a channel near the windshield and providing the biasing or holding pressure, the light shield now can move along said windshield at all angles by virture of the channel and the arm.

BRIEF DESCRIPTION OF THE DRAWINGS

Other objects, features and advantages of the invention together with its organization construction and operation will be best understood from the following detailed description of the preferred embodiment of the invention, taken in conjunction with the accompanying drawings, on which.

DESCRIPTION OF THE PREFERRED EMBODIMENT

Figure 1:
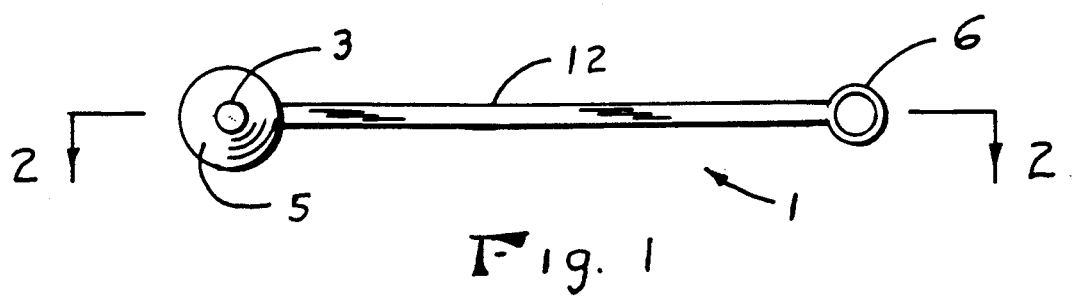
FIG. 1 is a plan view of a visor arm.
Figure 2:
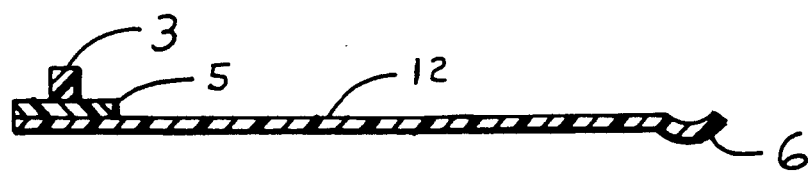
FIG. 2 is a sectional view, taken on line 2—2 of FIG. 1.
Figure 3:
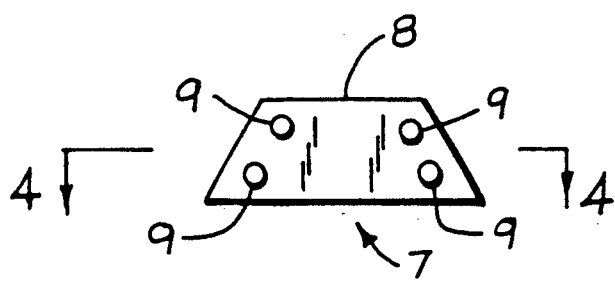
FIG. 3 is a plan view of a channel.
Figure 4:
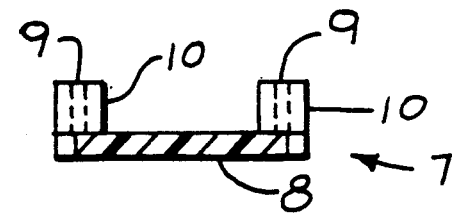
FIG. 4 is a sectional view, taken on lines 4—4 of FIG. 3.

Referring to the drawings in general and particularly to FIG. 1 of the drawings, there is shown a visor arm, shown generally by the numeral 1 which can be formed by plastic or any material desired. Each piece may be constructed in a one piece configuration as shown in FIG. 2 or may be constructed in more than one piece by providing manufactured joints where required. Also, FIG. 3 and 4 show a channel means 7 supporting the visor arm and shown generally by the numeral 7 which also can be manufactured in one piece or more than one piece providing manufactured joints.

The visor arm 1 working in conjunction with the channel 7 constitute a spot visor. The light shield can be positioned to reduce or eliminate harmful light through a conventional windshield 11.

Figure 5:
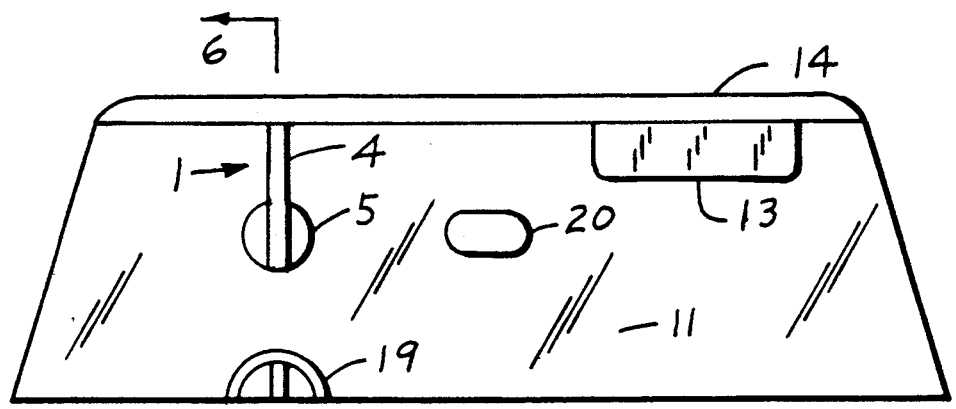
FIG. 5 is a front elevation of a vehicle windshield with the spot visor in place.
Figure 6:
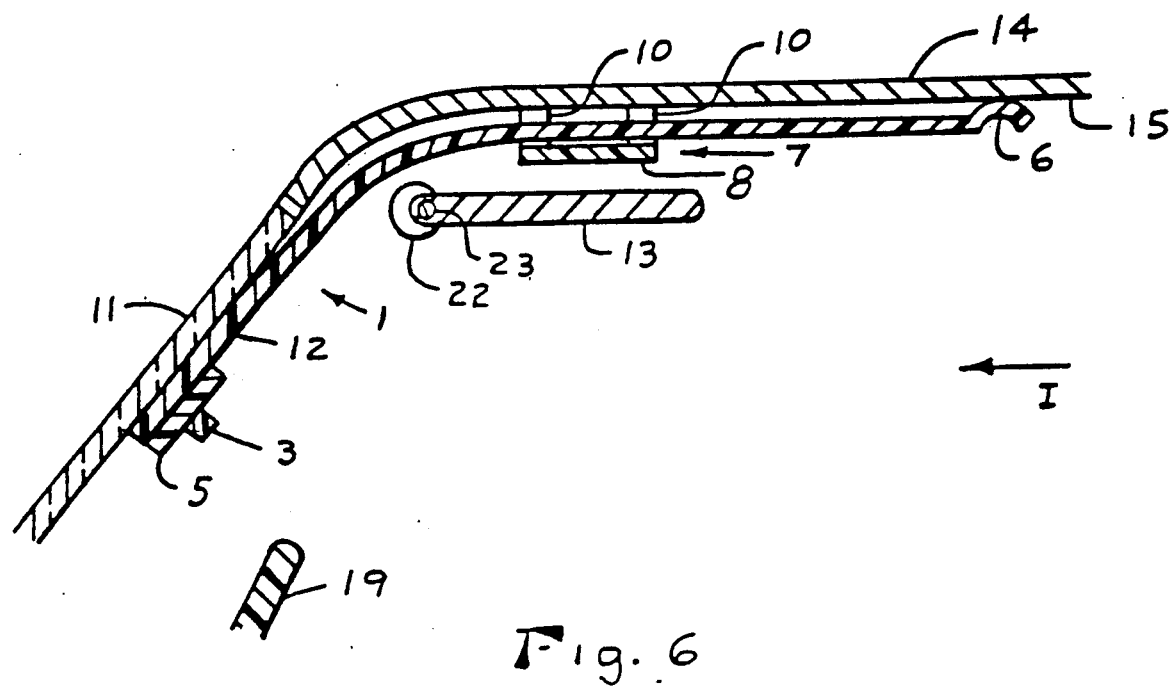
FIG. 6 is a sectional view taken on line 6—6 of FIG. 5.
Figure 7:
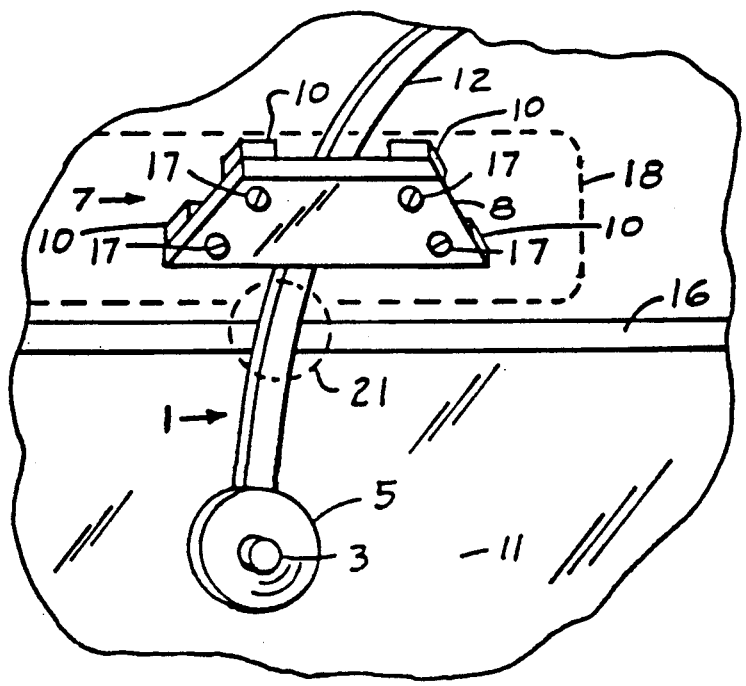
FIG. 7 is a pictorial view toward the front, showing a spot visor in place as seen in the direction of Arrow I in FIG. 6.

A conventional vehicle roof 14 protects the interior of a conventional vehicle environment from the sun shining in from above. The interior of the vehicle contains a hinge 22 attached to the vehicle and in turn a vehicle visor rod 23 is attached to it. Surrounding the vehicle visor rod 23 is a conventional vehicle visor 13 which is a generally rectangular padded piece of material. Also it is rotatable within the hinge 22 about a vertical axis. The vehicle visor 13 can be horizontally turned about the vehicle visor rod 23 to a position close to the windshield 11 and a position lifted away from the windshield 11, and generally either stored near a conventional vehicle ceiling 15 or moved out of view and sight of the user. (as seen in FIG. 5, 6 and 7)

Pursuant to the present invention there is provided a visor arm 1 which is composed of a resilient arm 12 having a light shield 5 to protect from harmful light especially sun's rays. It is manually moved into position by a handle 3. The opposite end contains a bearing 6 to protect the vehicle ceiling 15, when the handle 3 is moved. The reason being that when the handle 3 is moved, there is a corresponding movement in the end opposite of the handle 3.

Since the visor arm 1 operates best under tension using the resilient action of the arm 12 to maintain pressure on the light shield 5 and as a result pressure is placed on the bearing 6.

A channel means 7 formed of a plate 8 whose dimension is a number of times wider than the arm 12 which will ride in the channel, as seen in FIG. 1, 2 and 4.

An spacers 10 also form a part of the channel 7 and are part of plate 8 an are shaped for mounting on the vehicle ceiling. The spacers 10 serve to control the distance between the plate 8 and the vehicle ceiling 15 forming a passage for the arm 12.

Also the plate 8 holds the arm under tension urging light shield 5 toward the windshield 11.

The channel 7 is held in place by a fastener, such as a screw 17 passing through hole 9 in the spacers 10, as seen in FIGS. 4 and 7.

The arm 12 of the visor arm 1 is movably supported by the channel which is shaped to be mounted to the vehicle ceiling 15. The arm 12 supports an resiliently urges the light shield of the spot visor against a windshield for movement of the light shield 5 from one point to the next. The relative location of the channel the channel 7 mounted in place on the vehicle ceiling 15 and in the vicinity of the vehicle visor 13 can be seen by looking through a vehicle visor outline 18 to the channel 7 (see FIG. 6 and 7). Also the light shield 5 of the visor arm 1 on the windshield 11 can be raised to a storage position (outline of the light shield 21 1 in the storage position) 21 near the windshield molding 16 by holding the handle 3 in the same way that a rear view mirror 20 is manually positioned while holding on to a conventional steering wheel 19 when one is driving as seen in FIG. 6 and 7.

The light shield 5 can be moved along any line or direction in which the handle 3 is moved to. This is due to the combination of the arm 12 of the visor arm 1 being slidably supported within channel 7 for movement of the light shield 5. Also, the distance between the spacers 10 act to control the lateral movement of the light shield 5 on the windshield 11.

Many variations of the invention are possible, for example the visor arm 1 can substitute for the channel 7 the vehicle visor 13 supported by the vehicle visor rod 23 can be used to support the resilient arm 12 of the visor arm. However, the free end of the vehicle visor 13 should be secured as can be seen in FIG. 6.

Therefore, it is to be understood that the aforementioned invention herewith shown and described is to be taken as a preferred example of the same and that various changes relative to material, size, shape and arrangement of parts may be resorted to without departing from the spirit of the invention and the subjoined claims and their legal equivalents.

I claim:
1. A spot visor for a vehicle, comprising:
a visor arm having a resilient arm and a light shield located at one end thereof:
a channel to be secured at a forward end portion of a vehicle ceiling; and
means for movably mounting said visor arm on the vehicle ceiling with the resilient arm supported by said channel allowing the light shield of the spot visor to be manually moved for use on a windshield from one point to the next.
2. The spot visor as defined in claim 1,
wherein said channel comprises a plate and spacers.
3. The spot visor as defined in claim 2,
wherein the spacers mounted on the plate and shaped for a vehicle ceiling with the spacer locations having holes running through the plate to allow for the passage of fasteners.
wherein the light shield can be comprised of any type material such as resilient.
5. The spot visor as defined in claim 4,
wherein the light shield can have any shape such as round.
6. The spot visor as defined in claim 1,
further comprising a handle integrally connnected to the light shield for moving the light shield.
7. A spot visor as defined in claim 1,
further comprising a bearing formed integrally with the arm at the end opposite the light shield.
8. A spot visor as defined in claim 2,
wherein said channel can be comprised of any material such as plastic.
9. A spot visor as defined in claim 4,
wherein the light shield can be made form any material such as translucent thru opaque.
10. A spot visor as defined in claim 3,
wherein the channel comprises spacers which can control the lateral movement of the visor arm by the distance between the spacers.

* * * * *

UNITED STATES PATENT AND TRADEMARK OFFICE
CERTIFICATE OF CORRECTION

PATENT NO. : 5,040,842

DATED : August 20, 1991

INVENTOR(S) : James J.A. Sartore

It is certified that error appears in the above-identified patent and that said Letters Patent is hereby corrected as shown below:

On the title page:

ITEM [19]
    Change

United States Patent

Satore"

To

--United States Patent

Sartore--

ITEM [76]
    Change

"Inventor: James J. Satore, 128 Morris St.,"

To

--Inventor: James J.A. Sartore, 128 Morris St.,--.

Column 3, line 32, change "21 1" to -- 21 --.

Column 3, line 47, change "visor arm 1" to -- vehicle visor 13 --.

UNITED STATES PATENT AND TRADEMARK OFFICE
CERTIFICATE OF CORRECTION

PATENT NO. : 5,040,842

DATED : August 20, 1991

INVENTOR(S) : James J.A. Sartore

It is certified that error appears in the above-identified patent and that said Letters Patent is hereby corrected as shown below:

Column 4, between lines 27 and 28, insert -- 4. The spot visor as defined in claim 1 --.

Signed and Sealed this

Seventh Day of April, 1992

*Attest:*

HARRY F. MANBECK, JR.

*Attesting Officer*　　　　*Commissioner of Patents and Trademarks*